United States Patent [19]

Dede

[11] 4,197,037
[45] Apr. 8, 1980

[54] TANK DISTRIBUTION TAKE-AWAY SYSTEM

[76] Inventor: Edmund J. Dede, P.O. Box 1052, Terre Haute, Ind. 47808

[21] Appl. No.: 871,374

[22] Filed: Jan. 23, 1978

[51] Int. Cl.² .............................................. B65G 53/26
[52] U.S. Cl. .................................... 406/128; 251/144; 406/144
[58] Field of Search ....................... 302/27, 41, 51, 52, 302/57; 222/193, 630, 637; 251/144; 406/128, 144

[56] References Cited

U.S. PATENT DOCUMENTS

| | | | |
|---|---|---|---|
| 888,354 | 5/1908 | Rhode et al. | 302/41 |
| 1,311,524 | 7/1919 | Lee | 302/41 X |
| 2,704,206 | 3/1955 | Crook | 222/193 X |
| 3,207,560 | 9/1965 | Brown | 302/52 |
| 3,527,503 | 9/1970 | Mundinger | 302/52 |
| 3,675,975 | 7/1972 | Mundinger et al. | 302/27 X |
| 4,085,975 | 4/1978 | Bilkvist | 302/23 |

FOREIGN PATENT DOCUMENTS 940097 10/1963 United Kingdom ...................... 302/52

Primary Examiner—Robert J. Spar
Assistant Examiner—Fred A. Silverberg
Attorney, Agent, or Firm—Woodard, Weikart, Emhardt & Naughton

[57] ABSTRACT

A manifold assembly is provided for delivering flowable solid material, such as pelletized resin, for example, from a silo to a plurality of delivery pipes leading to extruding machines. The manifold is provided with gate valves for each delivery pipe, the valves being self-cleaning and easily controllable. A base portion of the manifold has a plurality of gated delivery tubes, while a top portion has at least one delivery tube of a larger diameter. Circular mounting flanges with equally spaced bolt holes between the lower and upper portions of the manifold facilitate any desired relative orientation of the delivery tube of the upper portion with respect to those of the lower portion. Also the upper portion has a circular flange for mounting in any desired position of index on a matching flange of a silo or hopper.

3 Claims, 6 Drawing Figures

TANK DISTRIBUTION TAKE-AWAY SYSTEM

BACKGROUND OF THE INVENTION

1. Field of the Invention

This invention relates generally to delivery and distribution means for air-entrained solid materials, and more particularly to a distribution manifold for selective delivery into one of any number of a plurality of delivery pipes.

2. Description of the Prior Art

In plants for molding plastic materials, various kinds of molding machinery may be employed. One type is an extruder which uses pelletized plastic resin and forces it through an extrusion die to form a bubble. Another type of machine which may be found is an injection molding machine which forces resin into a die to form a solid part. With either an extruder or an injection molding machine, there must be some means for getting the resin to the machine. This has been accomplished in the past by employing vacuum systems connected to a railroad car, or a silo, and conveying the resin in an air flow from the silo to a hopper above the molding or extruding machine. Where various machines are to be supplied with resin from a single source, such as a silo, it is necessary to provide some means to distribute the material to the various machines. Some of the devices heretofore employed have been unsatisfactory for various reasons; difficulty in shutting off or turning on the material, and limitations on direction of distribution from a location, being two of the problems. The present invention is the result of efforts directed to overcoming such problems.

SUMMARY OF THE INVENTION

Described briefly, in a typical embodiment of the present invention, a manifold assembly is provided for attachment to a storage container for granulated, pelletized or otherwise refined solid material. It contains an upper portion and lower portion, with at least one discharge tube in the upper portion and at least one discharge tube in the lower portion, more typically several in the lower portion. Means are provided at the upper and lower ends of the upper portion for connection respectively to a silo or other storage container at the top, and for connection to the lower portion at the bottom of the upper portion of the manifold assembly. Fastener means are arranged to permit variations in the direction faced by the discharge tubes in the respective portions.

Each of the portions includes a chamber for admission of air thereto and which will admit air to the discharge tube from outside the manifold when a vacuum is applied to the outlet end of the tube. Gate valves are provided on the tubes for selective opening and closing thereof, as desired, and are shaped for easy and complete closure, and for relative immunity to fouling.

DESCRIPTION OF THE PREFERRED EMBODIMENT

Figure 1:
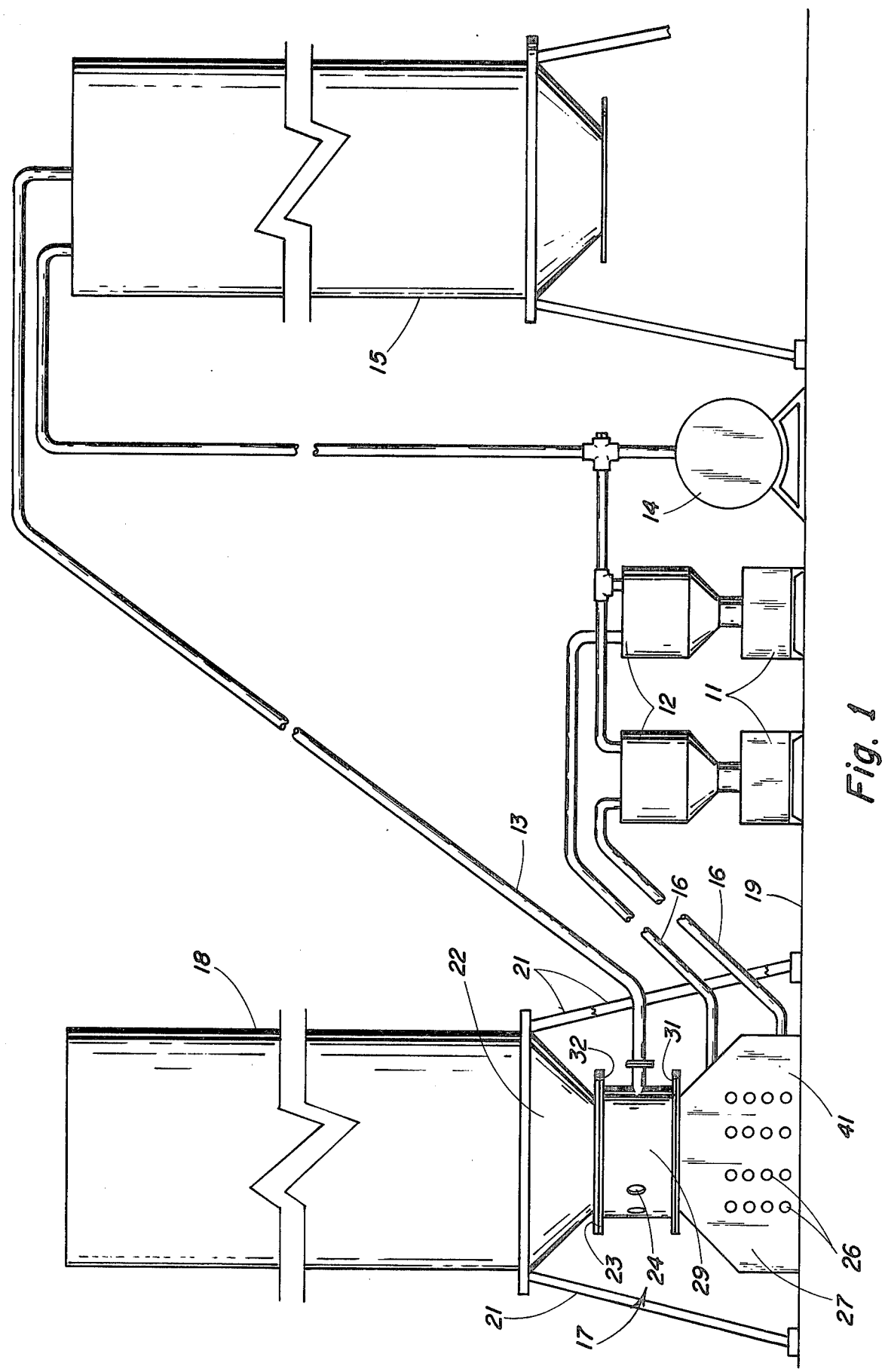
FIG. 1 is an elevational view of a system supplying pelletized resin to injection molding or extruding machines.

Referring now to the drawings in detail, FIG. 1 is a symbolic diagram of a system of supplying resin to extruding machines. In this example, the extruding machines are shown at 11, each of them being fed from directly above by resin in a hopper 12. The hoppers of the extruders are supplied with air-entrained resin through pipes 16 connected to a manifold assembly according to a typical embodiment of the present invention and shown generally at 17. A pipe 13 is useful for taking resin from silo 18 and delivering it elsewhere such as to silo 15.

The manifold assembly is connected to the bottom of a silo 18. This silo is supported on the ground 19 by four legs 21. The conical lower end 22 has a circular flange 23 on it. The resin is typically in a pelletized form in the silo or bin 18, and exits through the lower end opening into the manifold assembly through which air is drawn by a vacuum system coupled to pipes 16, the air entering ports such as 24 and 26 in the upper and lower portions, respectively. The air entrains resin from the silo to deliver it through the pipes 16 to the hoppers 12 associated with the extruders 11, or through pipe 13 for delivery to silo 15. A vacuum pump 14 coupled directly or indirectly (as shown) to pipes 13 and 16, establishes the needed air flow.

Although the description herein refers primarily to the delivery of resins to extruding machines, it should be understood that the present invention is very well applicable to varieties of granulated, pelletized, powdered, or otherwise refined solid materials for delivery thereof from one location to one or more destinations, as desired.

Figure 2:
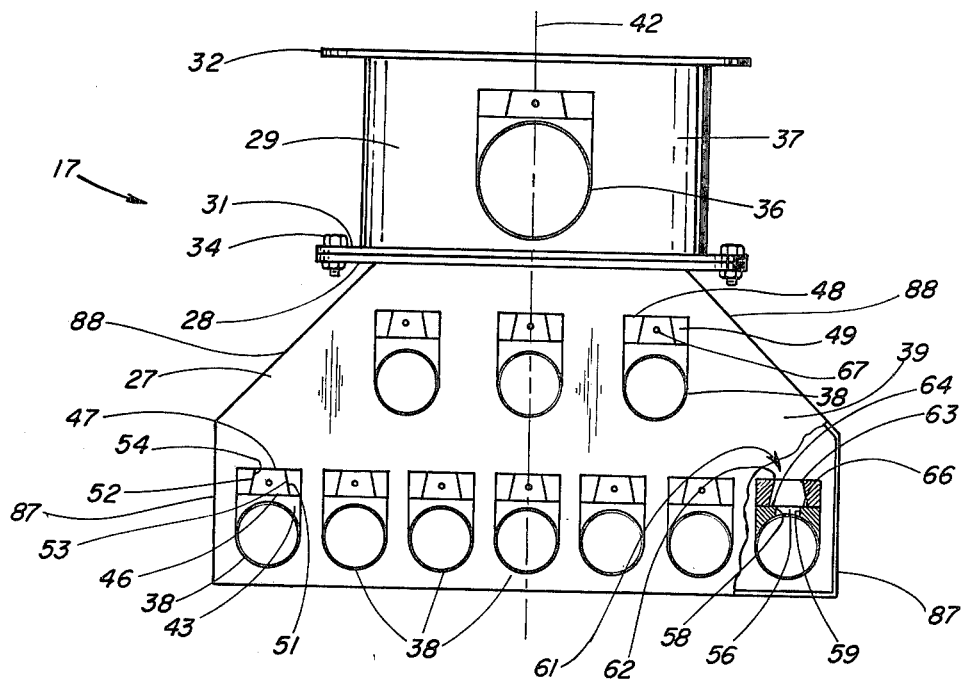
FIG. 2 is a front elevational view of a manifold assembly according to the invention as employed in FIG. 1, but on a much larger scale.
Figure 3:
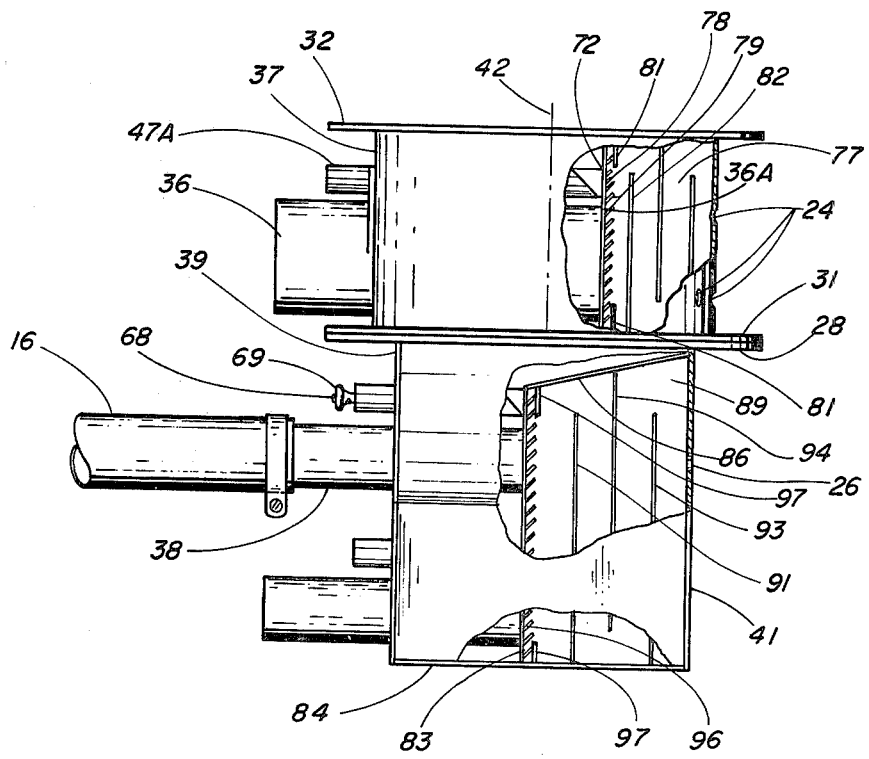
FIG. 3 is a side view thereof.
Figure 4:
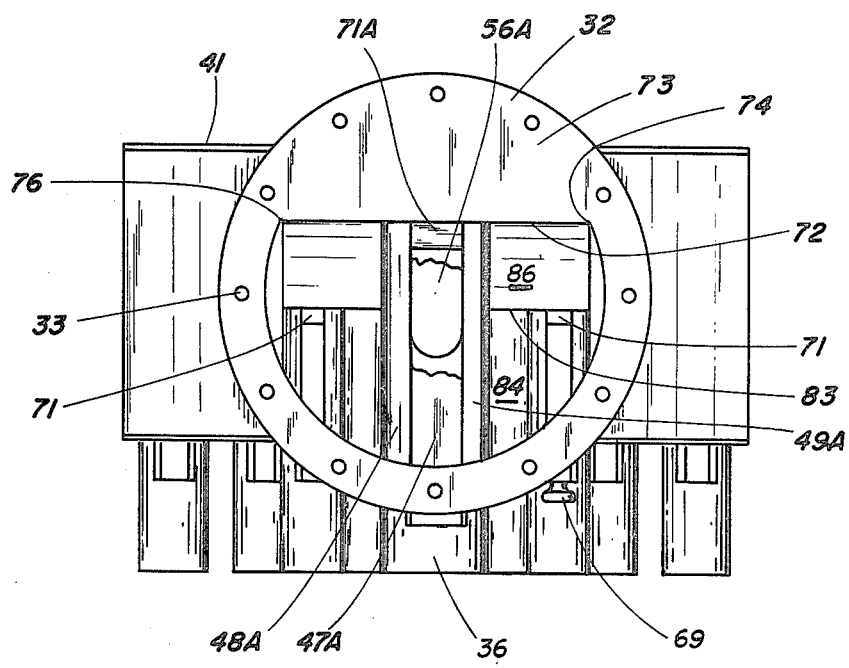
FIG. 4 is a top plan view thereof.

Referring now to FIGS. 2 through 4, the illustrated manifold assembly has a base portion 27 having a generally rectangular configuration as viewed from above (FIG. 4) with a circular bolt flange 28 welded to the upper end. The manifold also has the upper portion 29 having a generally cylindrical configuration as viewed from above (FIG. 4) and having circular bolt flanges 31 and 32 welded to the lower and upper ends, respectively, flange 32 serving as a mounting adaptor for attachment to a material storage container. The material employed for both portions is typically 6061-T6 aluminum and the fabrication is typically by welding. It should be understood that other materials and methods of fabrication may also be employed without departing from the scope of the invention.

In the system drawing of FIG. 1, it can be appreciated that the lower flange 23 of the bin or silo is received on the upper flange 32 of the upper portion of the manifold assembly. These two are secured together by bolts in a circularly spaced array. For a flange of approximately 18 inches outside diameter, there are typically 12 bolts used and they are employed at equal spacings in circularly spaced bolt holes 33 (FIG. 4) and secure the flanges together just as do the bolts 34 (FIG. 2) securing the flanges 28 and 31 together. Bolts 34 and the holes for them are in vertical alignment with the holes 33 in flange 32.

The upper manifold portion 29 has a delivery tube 36 projecting through the cylindrical wall 37 thereof. The base portion 27 has ten delivery tubes 38 projecting through the wall 39 thereof. The ports 26 in the base portion 27 are in a wall 41 in parallel, horizontally-spaced relation to the wall 39 as shown in FIG. 3. Comparison of FIGS. 1 and 2 will reveal that the orientation of tube 36 with respect to tubes 38 is different. For example, in FIG. 1, the tube 36 extends to the right, while the tubes 38 extend from the rear (into the paper) and therefore, being opposite the ports 26, do not appear at all. However, the pipes 16 are connected to them just as pipe 16 is connected to tube 38 in FIG. 3, for example. Thus one can see one of the important advantages of the present invention in the respect that the matching bolt flanges with the equally and circularly spaced holes both at 28 and 31 between the upper and the lower manifold portions, and at 23 and 32 between the bin and the upper manifold portion, enable a selection of any one of a variety of orientations of the tubes about a vertical axis 42 through the center of the cylindrical portion 29.

Figure 5:
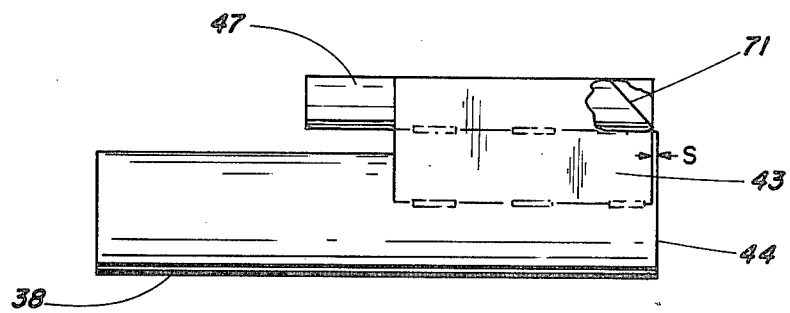
FIG. 5 is a side elevational view of a sliding gate valve according to a typical embodiment of the present invention.
Figure 6:
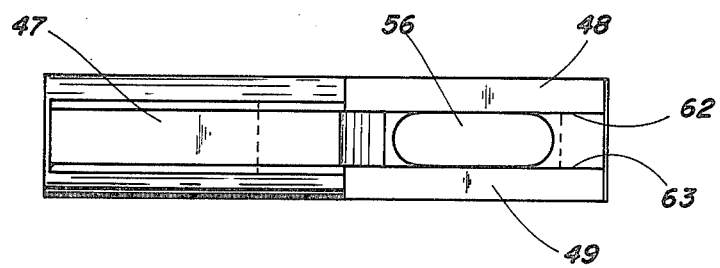
FIG. 6 is a top plan view thereof showing in the solid lines the fully open condition of the valve, and in dotted lines, the closed condition of the valve.

Referring now to FIGS. 5 and 6, there is shown a gate valve assembly according to a typical embodiment of the present invention. This includes a tube such as 38 having a rectangular block 43 fitted around the top half adjacent the inlet end 44 of the tube and suitably welded to the tube. Since this assembly is typical of the ten assemblies mounted in the base portion, reference will be made to FIG. 2 along with FIGS. 5 and 6 in the description of the gate valve assembly. The top surface 46 of the block 43 serves as a bed for the slide 47. Blocks 48 and 49 are welded to the top of block 43 and serve as side guides for the slide 47 as it is moved between the open and closed condition.

As shown in FIG. 2, the sides of the slide are inclined downward and outward as shown at 51 and 52, the angle being 15° from vertical (75° from horizontal). Similarly, the guiding faces 53 and 54 of the guides 48 and 49 are likewise inclined downwardly and outwardly.

As best shown in FIG. 6, a longitudinal slot 56 is provided in the guide assembly and tube, typically being end milled in the block 43 and tube 38 after they have been welded together. The width of the slot from wall 58 to wall 59 is about the same as the width of the slot 61 established by the upper edges 62 and 63 of the guides 48 and 49 at the upper edges respectively of walls 54 and 53 where they intersect the top faces of the guides. Consequently there is provided a running ledge 64 and 66 at each side of the slide on the bed surface 46. Each of the slides has a threaded aperture 67 in the outer end thereof for reception of a screw 68 (FIG. 3) by which a handle 69 may be secured to the slide. This facilitates manual actuation of the slide between the maximum open position shown in the solid lines in FIG. 6, and the maximum closed position shown in the dotted lines in FIG. 6. The closing end 71 of the slide is inclined upwardly away from the sealing face 46 of the valve block at an angle of 45°. This facilitates manual closing of the valve even when the silo above it is full of resin and the flow through the valve is significant. The construction of the valve on tube 36 in the intermediate portion is essentially the same as that described here for tubes 38. The materials are typically 6061-T6 aluminum.

Referring further to FIGS. 2, 3 and 4, there is a vertical wall 72 in the cylindrical portion of the manifold assembly. This extends from a horizontal top wall 73 flush with the flange 32 and of which flange 32 is a part from location 74 to 76. In other words, the wall 73 is integral with the material of the flange 32. The vertical wall 72 extends downwardly from wall 73 to an identical bottom wall integral with flange 31. These walls cooperate with the portion of cylindrical wall 37 extending from point 74 to 76 to form a chamber 77 (FIG. 3). This chamber has air entry ports 24 in the cylindrical wall portion thereof, and a singular air outlet port 78 in wall 72. This port fittingly receives the inner end 36A of the tube 36 which is welded to plate 72 at that location. This is typically the only aperture in wall 72 and provides communication of the tube with the air chamber 77. In order to avoid passage of any resin from the tube 36 into chamber 77, there is a screen 79 mounted to the chamber-side of the wall 72. This screen may be fastened to the wall in any suitable manner and may, in fact, be sandwiched between wall 72 and a parallel wall 81 shown fragmentarily and welded or otherwise secured to the upper and lower walls of chamber 77. Three horizontally spaced baffle plates 82 may be provided in the chamber, two of them being secured at the bottom with space between them and the top of the chamber, and one of them being secured at the top with space between its lower end and the bottom of the chamber.

As shown in FIG. 1, the tube 36 extends through the space in the upper manifold portion 29 in front of wall 72. The slide is given the reference numeral 47A and the side guides are 48A and 49A. The leading or closing edge 71A of the valve is shown in the closed position against the wall 72.

Referring further to FIG. 4, one can look through the space within the upper manifold portion 29 and in front of the wall 72 and see that there are portions of two of the gate valves of the lower or base portion 27 which can be seen at the left and right-hand sides of the valve assembly for the upper portion. Also, as is apparent upon comparison of FIGS. 3 and 4, there is a vertical wall 83 which extends up from the bottom 84 of the base portion to an inclined wall 86 which extends upwardly and rearwardly from wall 83 to the point of junction of wall 41 with flange 28. Walls 41, 83, 84 and 86 cooperate with the vertical walls 87 and sloping walls 88 (FIG. 2) to provide an air chamber 89 in the base portion of the manifold assembly. Apertures 26 in wall 41 communicate and provide air entrance means for this chamber, and there are typically 16 of them. In addition, three baffle plates are provided in this chamber, of which plates 91 and 93 are secured to the bottom 84, and spaced from the top 86, while intermediate plate 94 is secured to the top 86 and spaced from the bottom 84. Wall 83 has ten apertures therein, each of which receives the inner end of one of the tubes 38 which is sealed thereto by welding or otherwise. The valve slide end of each valve can thus be closed against the front of wall 83 in the same manner as the closing edge at the bottom of the end 71A of slide 47A can be closed against wall 72 in the upper portion. There is a slight step back of the end of the valve block 43 with respect to the inner end 44 of the tube as shown in FIG. 5 at "S" and this type of construction is typically installed on all of the gate valves, regardless of whether they are the small ones used in the lower portion or large ones as used in the upper portion. Therefore, in assembly of the tubes to the inner mounting walls of the chambers, the tube can be fittingly received in a matching hole in the wall while the valve bed block abuts the surface of the wall opposite the chamber-side. This facilitates assembly, sealing, and secures sealing of the gate against the wall when the valve is closed. In a manner similar to that described above for chamber 77, a screen 96 is mounted on the chamber side of wall 83 and may be sandwiched between that wall and another retainer wall 97 having in it ports which match the ports of holes in which the tubes 38 are mounted in wall 83. The type of screen used in both instances is typically a shade screen type with the louvers thereof upwardly inclined in the direction shown in the drawings, to deflect any resin pellets outward and downward away from the interior of the chamber.

The slope of wall 86 which serves as the top of air chamber 89 is downward and forward toward the slots in the gate valves of the lower portion of the manifold. Also as shown in FIG. 2, the position of the valves in the upper level is staggered with respect to the positions of the valves in the lower level of the base portion. This type of construction facilitates adequate exposure of all of the gates to the resin falling through the upper portion and into the lower portion so that adequate supply of resin to all of the gates can be achieved. The actual flow of material from the manifold to the various extruders or molding machines or other equipment supplied by the silo will be determined by a combination of the flow established by the vacuum system and valving thereon and the adjustments made by the operator to the positions of the various gates supplying the various material utilizing machines.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A resin tank distribution take-away system assembly comprising:

manifold means having mounting adaptor means for mounting to a material storage container;

a plurality of outlet tubes in said manifold means for distribution of material from said manifold means;

valve means associated with said outlet tubes for controlling passage of material from said manifold means outwardly through said tubes, said valve means including sliding gate means;

each of said tubes having an inlet end and an outlet end; and said manifold means having a first chamber communicating with the inlet ends of some of said tubes, and air inlets from the exterior of said manifold means to said chamber to enable vacuum means attached to the outlet ends of said tubes to establish air flow from said chamber through said tubes to said outlet ends;

a second air chamber in said manifold means and communicating with the inlet end of another of said tubes;

and an air inlet from the exterior of said manifold means to said second chamber to enable vacuum means attached to the outlet end of said another tube to establish air flow from said second chamber through said another tube inlet end and said tube to its outlet end;

said manifold means including first and second manifold portions, the inlet ends of said some tubes being in said first portion, and the inlet end of said another tube being in said second portion, said first and second portions having cooperating mounting means accommodating attachment of said first and second portions together in different relative positions for selection of different directions of said outlet ends of said another tube and said some tubes;

said cooperating mounting means including first and second flanges on said first and second portions, respectively, said flanges having circles of bolt holes wherein various combinations of holes in said flanges are alignable to obtain said different relative positions;

said flanges being circular, and said mounting adaptor means being provided on said second portion and including a third circular flange in parallel, vertically spaced relationship to said second flange, for attaching to a circular outlet member of a storage container;

said first manifold portion having a vertically extending partition dividing said first portion into said first chamber and into supply passage means for flowable material to flow down from said second portion through said gate means into said tubes, said second portion having a vertically extending partition dividing said second portion into said second chamber and into a passageway for flow of material from a storage container above into the passageway of said first portion;

said first portion including a top on said first chamber sloping up from said partition of said first portion and away from said passageway therein toward the outer wall of said first portion to guide material toward said passageway therein from the said passageway in said second portion regardless of the rotational position of said second portion relative to said first portion.

2. The assembly of claim 1 wherein:

said tubes in said first portion include a first group and a second group, said first group being at a lower level than said second group, the tubes in said second group being out of vertical alignment with the tubes of said first group to avoid preventing material from flowing down into the tubes of said first group from above.

3. The assembly of claim 2 wherein:

each said chambers has a plurality of baffles therein arranged to impart a serpentine flow path to air flowing through said chambers from the chamber inlets to the tube inlets communicating with said chambers.

* * * * *